(12) United States Patent
Morris et al.

(10) Patent No.: US 8,054,606 B2
(45) Date of Patent: Nov. 8, 2011

(54) REMOTE OPERATION OF A MOTOR CONTROL CENTER SUBUNIT DISCONNECT

(75) Inventors: Robert A. Morris, Fayetteville, NC (US); Edgar Yee, Chapel Hill, NC (US); Jared A. Bryll, Fayetteville, NC (US); Daniel J. Leeman, Fuquay-Varina, NC (US); Daniel B. Kroushl, Clayton, NC (US)

(73) Assignee: Eaton Corporation, Cleveland, OH (US)

( * ) Notice: Subject to any disclaimer, the term of this patent is extended or adjusted under 35 U.S.C. 154(b) by 644 days.

(21) Appl. No.: 12/136,116

(22) Filed: Jun. 10, 2008

(65) Prior Publication Data

US 2009/0301851 A1  Dec. 10, 2009

(51) Int. Cl.
*H01H 73/00* (2006.01)
*H02B 1/00* (2006.01)
*H02B 13/02* (2006.01)
*H02B 1/26* (2006.01)

(52) U.S. Cl. ......... 361/115; 361/601; 361/614; 361/622

(58) Field of Classification Search .................. 361/115, 361/601, 614, 622
See application file for complete search history.

(56) References Cited

U.S. PATENT DOCUMENTS

| | | | |
|---|---|---|---|
| 3,303,395 A | 2/1967 | Eck | |
| 3,308,348 A | 3/1967 | Olashaw et al. | |
| 3,469,043 A | 9/1969 | Wilson | |
| 3,474,363 A * | 10/1969 | Shaffer et al. | 335/73 |
| 3,482,143 A | 12/1969 | Stark et al. | |
| 3,495,135 A | 2/1970 | Paape | |
| 3,626,253 A | 12/1971 | Sturdivan | |
| 3,633,075 A | 1/1972 | Hawkins | |
| 3,896,353 A | 7/1975 | Burton et al. | |
| 4,024,441 A | 5/1977 | Coyle et al. | |
| 4,038,585 A | 7/1977 | Wolski et al. | |
| 4,068,287 A | 1/1978 | Kruzic et al. | |
| 4,077,687 A | 3/1978 | Farag | |
| 4,090,230 A | 5/1978 | Fuller et al. | |
| 4,118,607 A | 10/1978 | Shaffer | |
| 4,121,276 A | 10/1978 | Kovatch et al. | |
| 4,178,624 A | 12/1979 | Wilson et al. | |
| 4,180,845 A | 12/1979 | Shariff et al. | |
| 4,212,272 A * | 7/1980 | Hawk | 123/339.25 |
| 4,233,643 A | 11/1980 | Iverson et al. | |
| 4,292,661 A | 9/1981 | Johnson et al. | |
| 4,355,269 A | 10/1982 | Burton et al. | |
| 4,427,854 A | 1/1984 | Kleinecke et al. | |

(Continued)

FOREIGN PATENT DOCUMENTS

DE  10006427 C2  8/2001

*Primary Examiner* — Jared Fureman
*Assistant Examiner* — Scott Bauer
(74) *Attorney, Agent, or Firm* — Ziolkowski Patent Solutions Group, SC

(57) ABSTRACT

A system and method are provided for remotely actuating a subunit disconnect in a motor control center subunit. A motor control center subunit includes a subunit housing configured to fit within a motor control center and a subunit disconnect configured to selectively control a supply power to motor control components of the subunit housing. A control mechanism is attached to the subunit housing to activate and deactivate the subunit disconnect and a remote control device communicates with the control mechanism and is configured to operate the control mechanism to activate and deactivate the subunit disconnect.

22 Claims, 6 Drawing Sheets

U.S. PATENT DOCUMENTS

| | | | |
|---|---|---|---|
| 4,447,858 A | 5/1984 | Farag et al. | |
| 4,502,097 A | 2/1985 | Takahashi | |
| 4,621,303 A | 11/1986 | Rowe | |
| 4,652,966 A | 3/1987 | Farag et al. | |
| 4,693,132 A | 9/1987 | Buxton et al. | |
| 4,713,501 A | 12/1987 | Herrmann | |
| 4,728,757 A | 3/1988 | Buxton et al. | |
| 4,743,715 A | 5/1988 | Gerbert-Gaillard et al. | |
| 4,760,220 A | 7/1988 | Fritsch et al. | |
| 4,768,967 A | 9/1988 | Fritsch | |
| 4,789,344 A | 12/1988 | Fritsch et al. | |
| 4,789,919 A | 12/1988 | Cox et al. | |
| 4,853,830 A | 8/1989 | Corfits et al. | |
| 4,860,161 A | 8/1989 | Maki et al. | |
| 4,926,286 A | 5/1990 | Maki et al. | |
| 5,019,676 A | 5/1991 | Heckenkamp | |
| 5,124,881 A | 6/1992 | Motoki | |
| 5,337,210 A | 8/1994 | Ishikawa et al. | |
| 5,424,910 A | 6/1995 | Lees | |
| 5,424,911 A | 6/1995 | Joyner et al. | |
| 5,459,293 A | 10/1995 | Hodkin et al. | |
| 5,477,016 A * | 12/1995 | Baginski et al. | 200/43.11 |
| 5,481,075 A | 1/1996 | Kleinecke et al. | |
| 5,486,663 A | 1/1996 | Fritsch et al. | |
| 5,495,388 A | 2/1996 | Bonetti et al. | |
| 5,510,960 A | 4/1996 | Rosen | |
| 5,530,414 A | 6/1996 | Reynolds | |
| 5,539,614 A | 7/1996 | Ishikawa et al. | |
| 5,568,033 A | 10/1996 | Brunson | |
| 5,592,360 A | 1/1997 | Beck et al. | |
| 5,625,531 A | 4/1997 | Padilla et al. | |
| 5,642,256 A | 6/1997 | Pugh et al. | |
| 5,691,686 A | 11/1997 | Ishikawa et al. | |
| 6,005,208 A * | 12/1999 | Castonguay | 200/308 |
| 6,015,958 A | 1/2000 | Pomatto et al. | |
| 6,087,602 A | 7/2000 | Bernier et al. | |
| 6,141,206 A | 10/2000 | Bruner et al. | |
| 6,207,909 B1 | 3/2001 | Tallman et al. | |
| 6,284,989 B1 | 9/2001 | Bernier et al. | |
| 6,414,839 B1 | 7/2002 | Derksen | |
| 6,423,913 B1 | 7/2002 | Gupta et al. | |
| 6,433,999 B1 | 8/2002 | Muse et al. | |
| 6,435,631 B1 | 8/2002 | Yee et al. | |
| 6,512,669 B1 | 1/2003 | Goodwin et al. | |
| 6,531,670 B1 | 3/2003 | Pugh | |
| 6,551,111 B1 | 4/2003 | Watanabe | |
| 6,700,062 B1 | 3/2004 | Allen, Jr. | |
| 6,717,076 B2 | 4/2004 | Narusevicius et al. | |
| 6,831,226 B2 | 12/2004 | Allen, Jr. | |
| 6,861,596 B2 | 3/2005 | Schnackenberg | |
| 6,864,443 B1 | 3/2005 | Bruchmann | |
| 6,878,891 B1 | 4/2005 | Josten et al. | |
| 6,951,990 B1 | 10/2005 | Miller | |
| 7,019,230 B1 | 3/2006 | Vaill et al. | |
| 7,292,422 B2 | 11/2007 | Culligan et al. | |
| 7,311,538 B2 | 12/2007 | West | |
| 7,337,450 B2 | 2/2008 | Sato et al. | |
| 7,466,554 B2 | 12/2008 | Matsumoto et al. | |
| 7,525,809 B2 | 4/2009 | Bergmann et al. | |
| 7,544,908 B2 | 6/2009 | Webb et al. | |
| 2002/0021548 A1 | 2/2002 | Muse et al. | |
| 2003/0200648 A1* | 10/2003 | Greer | 29/622 |
| 2004/0050820 A1* | 3/2004 | McKean et al. | 218/154 |
| 2004/0166729 A1 | 8/2004 | Allen, Jr. | |
| 2004/0201972 A1 | 10/2004 | Walesa | |
| 2006/0067018 A1 | 3/2006 | Malkowski, Jr. et al. | |

* cited by examiner

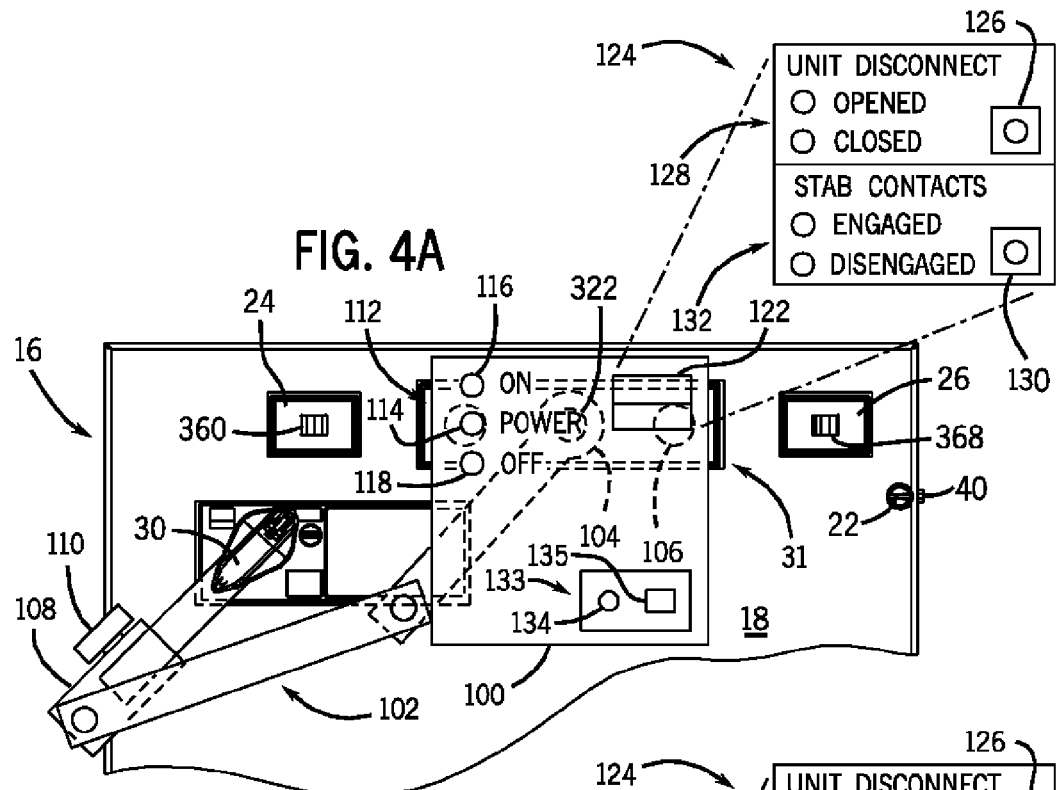
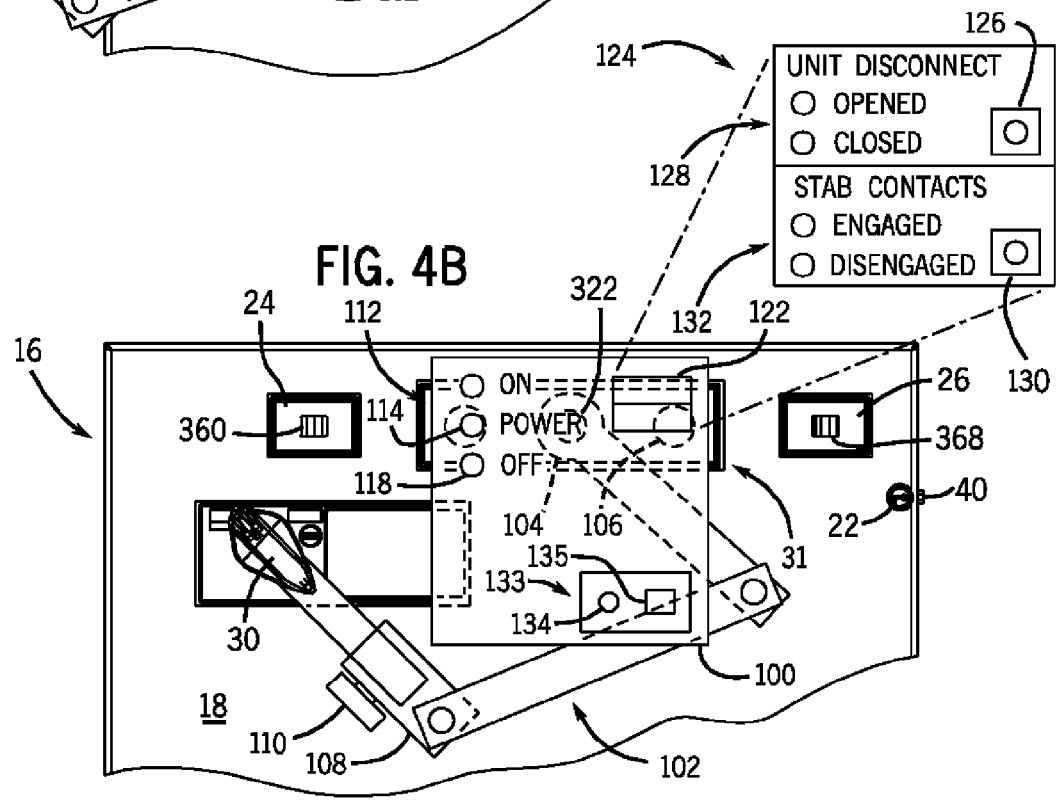

REMOTE OPERATION OF A MOTOR CONTROL CENTER SUBUNIT DISCONNECT

BACKGROUND OF THE INVENTION

The present invention relates generally to motor control systems, and more particularly, to motor control center subunits having a remote disconnect system which governs the connection of motor control components to supply power. In one embodiment, the system and method described herein provides for the connection and/or disconnection of supply power to the motor control components via the control of a subunit circuit breaker from a remote location.

A motor control center is a multi-compartment steel enclosure with a bus system to distribute electrical power, on a common bus system, to a plurality of individual motor control units mountable within the compartments. The individual motor control center subunits are commonly referred to as "buckets" and are typically constructed to be removable, pull-out units that have, or are installed behind, individual sealed doors on the motor control center enclosure. These buckets may contain various motor control and motor protection components such as motor controllers, starters, contactor assemblies, overload relays, circuit breakers, motor circuit protectors, various disconnects, and similar devices for electric motors. The buckets connect to the supply power lines of the motor control center and conduct supply power to the line side of the motor control devices, for operation of motors. Motor control centers are most often used in factories and industrial facilities which utilize high power electrical motors, pumps, and other loads.

Typically, the motor control center units are monitored and controlled on-site by an operator. The operator controls the activation of subunits in the motor control center and may, for various reasons (e.g., a system alert), elect to open or close a circuit breaker/unit disconnect so as to connect and/or disconnect supply power to the subunit. For motor control center starter units, an actuation of the unit disconnect does not automatically energize the motor circuit. Instead, the energizing of the motor circuit is controlled via a remote computer or communications protocol.

In "feeder" motor control center units, however, such actuation of the unit disconnect acts to energize the motor circuit. In existing "feeder" motor control center designs, it has been necessary for the operator to manually turn a disconnect handle, which operates the circuit breaker/unit disconnect control switches to control such connection and disconnection. Once activated, the switches control a number of individual switching mechanisms within the circuit which ultimately open or close the circuit. By tripping the circuit, power distribution can be managed. The manual operation of the disconnect handle, however, requires that an operator be located in the vicinity of the motor control center. Thus, it may be necessary for the operator to travel back and forth to the motor control center to manually actuate the disconnect handle. Furthermore, manual actuation of the disconnect handle also necessitates that the operator put on protective gear so as to be shielded from potential arc flash events that can occur, as is known in the art. The putting-on and removal of such protective gear can be time consuming and the need for the operator to be in proximity to the motor control center to manually actuate the unit disconnect is highly undesirable.

While the use of a shunt trip is possible for remotely actuating (i.e., opening) the circuit breaker/unit disconnect, the use of shunt trips shortens the life of the circuit breaker. That is, while shunt tripping may be a practical means for opening the circuit breaker remotely, use of a shunt trip results in the need for the breaker to be cycled through a reset action. Additionally, use of the shunt trip to repeatedly open the circuit breaker increases wear on the circuit breaker, as such mechanisms are typically designed for only 10% shunt trip operation.

It would therefore be desirable to design a motor control center bucket assembly that overcomes the aforementioned drawbacks. A control mechanism and a remote device that allows for remote connection or disconnection of the circuit breaker, without the use of a shunt trip, would be beneficial, by providing a more efficient and cost-effective system for controlling a motor control center unit circuit breaker.

BRIEF DESCRIPTION OF THE INVENTION

The present invention provides a system and method for electrically connecting and disconnecting motor control components of the motor control center subunit to a power supply from a remote location. In one embodiment, the system and method described herein provides for the connection and/or disconnection of supply power to the motor control components via the control of a subunit circuit breaker from a remote location.

Therefore, in accordance with one aspect of the present invention, a motor control center subunit includes a subunit housing configured to fit within a motor control center and a subunit disconnect configured to selectively control a supply power to motor control components of the subunit housing. The motor control center subunit also includes a control mechanism attached to the subunit housing to activate and deactivate the subunit disconnect and a remote control device configured to operate the control mechanism to activate and deactivate the subunit disconnect.

In accordance with another aspect of the invention, a remotely controlled actuation mechanism for actuating a circuit breaker disconnect handle includes a housing, an electric motor positioned within the housing and configured to generate an output torque, and an adapter coupled to the electric motor and to a disconnect handle of a circuit breaker assembly, the adapter configured to transfer the output torque to the disconnect handle so as to translate the disconnect handle between a first position and a second position. The remotely controlled actuation mechanism also includes a remote control configured to send control signals to the electric motor from a remote location so as to activate the electric motor to translate the disconnect handle.

In accordance with yet another aspect of the invention, a motor control center includes a motor control center frame having at least one compartment, a motor control center subunit constructed to seat in the at least one compartment of the motor control center frame, and a circuit breaker assembly configured to selectively control a supply power to the motor control center subunit. The motor control center also includes a disconnect handle attached to the subunit housing and constructed to open and close the circuit breaker assembly to selectively control the supply power to the motor control center subunit and a remotely controlled actuating mechanism to actuate the disconnect handle and remotely control at least one of the opening and closing of the circuit breaker assembly.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIGS. 4A and 4B are partial front views of the motor control center subunit of FIG. 2 and of a control mechanism and disconnect handle thereon in ON and OFF positions.

DETAILED DESCRIPTION OF THE PREFERRED EMBODIMENTS

The following description makes reference to supply power, supply power lines, motor power, load power, line power, and the like. It is appreciated that such terms may refer to a variety of both common and uniquely conditioned voltage and current characteristics, including but not limited to, three phase AC power, single phase AC power, DC power, multiple DC power lines, or any combination thereof. Such power characteristics will be generally referred to as being provided on a bus, supply line, or riser of a motor control center. However, it is appreciated that the present invention may find applicability in other power connectivity configurations adapted or apart from motor control centers, such as high power electrical switchboard arrangements and panel board arrangements. An example of supply power commonly used in motor control centers is 480V three-phase AC power distributed over three separate supply bus bars.

References to "motor control components" shall be understood to include the various types of devices and control components which may be housed in a motor control center bucket for connection to the supply power. Such devices and components include contactors, relays, motor controllers, disconnects, circuit protective devices, and the like. Furthermore, while the unit disconnects that control connection of the motor control center/switchboard to the supply power is described herein as a circuit breaker assembly, it is understood that fused disconnect arrangements are also envisioned and fall within the scope of the present invention.

Figure 1:
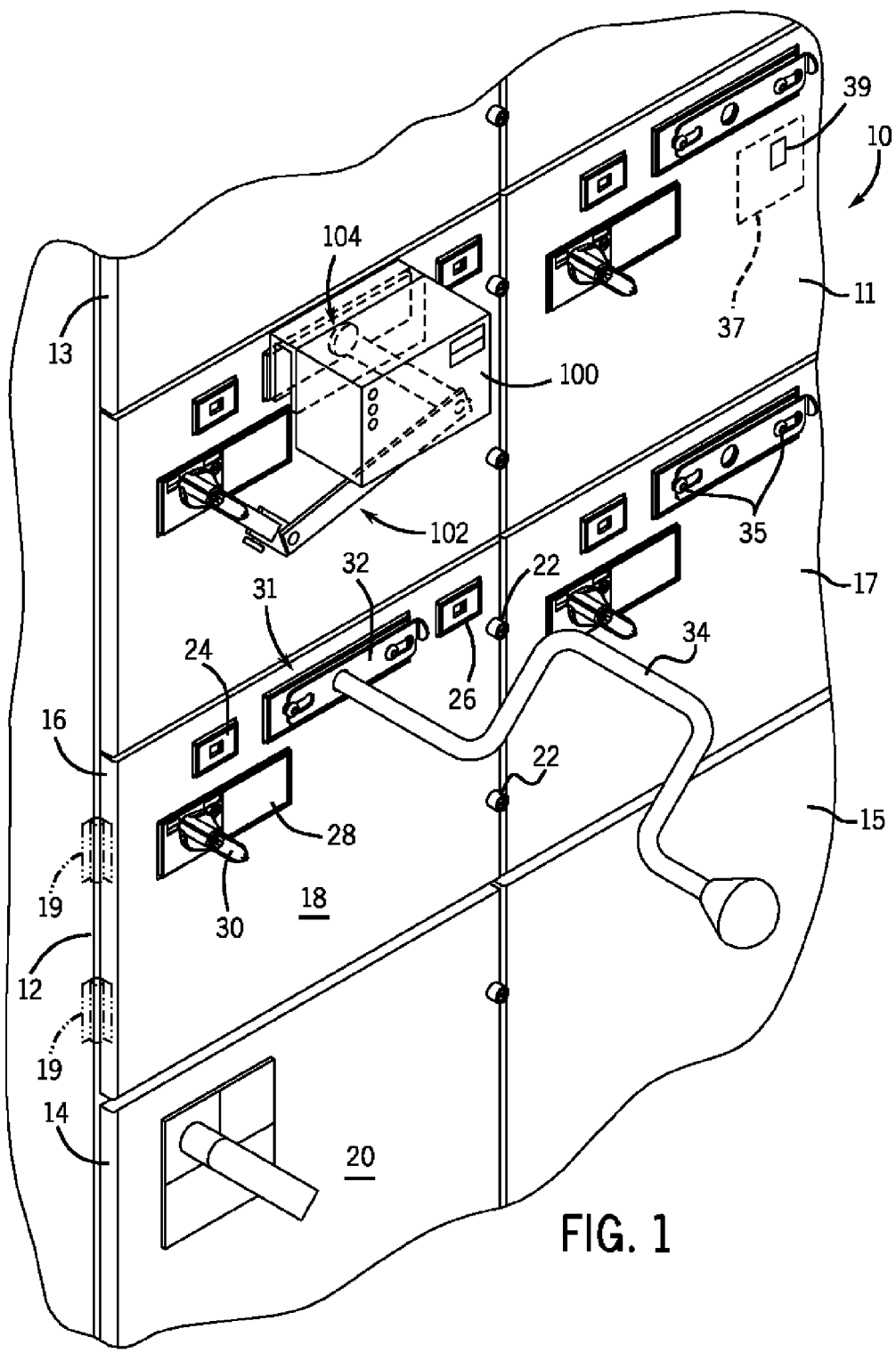
FIG. 1 is a partial perspective view of a number of motor control center subunits installed in a motor control center, according to an embodiment of the present invention.

Referring to FIG. 1, a partial perspective view of a motor control center structure 10 is shown. As discussed above, motor control centers are generally formed of a frame 314 that may include compartments or enclosures for multiple control modules or buckets (i.e., subunits) 11, 13, 14, 15, 16, 17. Bucket 16 is shown fully installed into motor control center compartment or enclosure 12 such that its front panel 18 is seated securely against the periphery of enclosure 12 and flush with the front panel 20 of bucket 14. In this regard, bucket 16 includes a number of latching mechanisms 22 on front panel 18 so that an operator may lock bucket 16 into place once installed. In some embodiments, front panel 18 may be a deadfront door having a set of hinges 19 in order to permit access to motor control components within bucket 16 while bucket 16 is installed in enclosure 12 of motor control center 10. However, even when closed or sealed, front panel or door 18 still permits access to a subunit disconnect 28 (i.e., circuit breaker assembly), stab indicator 24, shutter indicator 26, and line contact actuator 31.

Line contact actuator 31 is a mechanism for engaging line contacts (FIG. 2) with line power from the motor control center 10. Thus, even when bucket 16 is fully installed in enclosure 12 and latches 22 have been secured, an operator may still use disconnect handle 30 and may open slide 32 to insert crank 34 to move one or more line contacts (not shown) of the bucket 16. When slide 32 is moved aside to permit access to actuating mechanism 31, door 18 is prevented from opening, thereby closing off access to components inside bucket 16. Additionally, a user may desire to padlock the slide 31 in the closed position, to further regulate who may operate actuating mechanism 31 and when. Line contact actuator 31 also includes a pair of anchor points 35 formed thereon that allow for the mounting of additional control elements to front panel 18. In one embodiment, anchor points are formed as threaded openings configured to receive a screw therein. It is also envisioned that other similar connections could be used, such as a snap-fit connection between anchor points 35 and a mounted device.

Referring still to FIG. 1, as an alternative to, or in combination with, using a hand crank, a line contact motor drive 37 may be used to operate actuating assembly 31. In one embodiment, motor drive 37 is positioned inside a bucket, as shown with bucket 11. Preferably, line contact motor drive 37 is a DC motor remotely operable from distances of 10-50 ft, whether wirelessly or with a wired controller. When it is desired to send wireless signals to line contact motor drive 37, a receiver 39 is included therein to receive such wireless signals. Line contact motor drive 37 may be powered by a battery or by an electrical connection with motor control center 10, such as via the control power contact 44 shown in FIG. 2 or a similar plug or connection. It is recognized, however, that many other types, sizes, and configurations of motor drive 37 are equivalently applicable. In addition, an interlock circuit may be included (not shown) to only allow operation of the motor drive 37 when the bucket 11 is installed in motor control center 10. This may be as simple as a contact switch that completes an input power circuit or may include more sophisticated position sensors or latch sensors.

Figure 2:
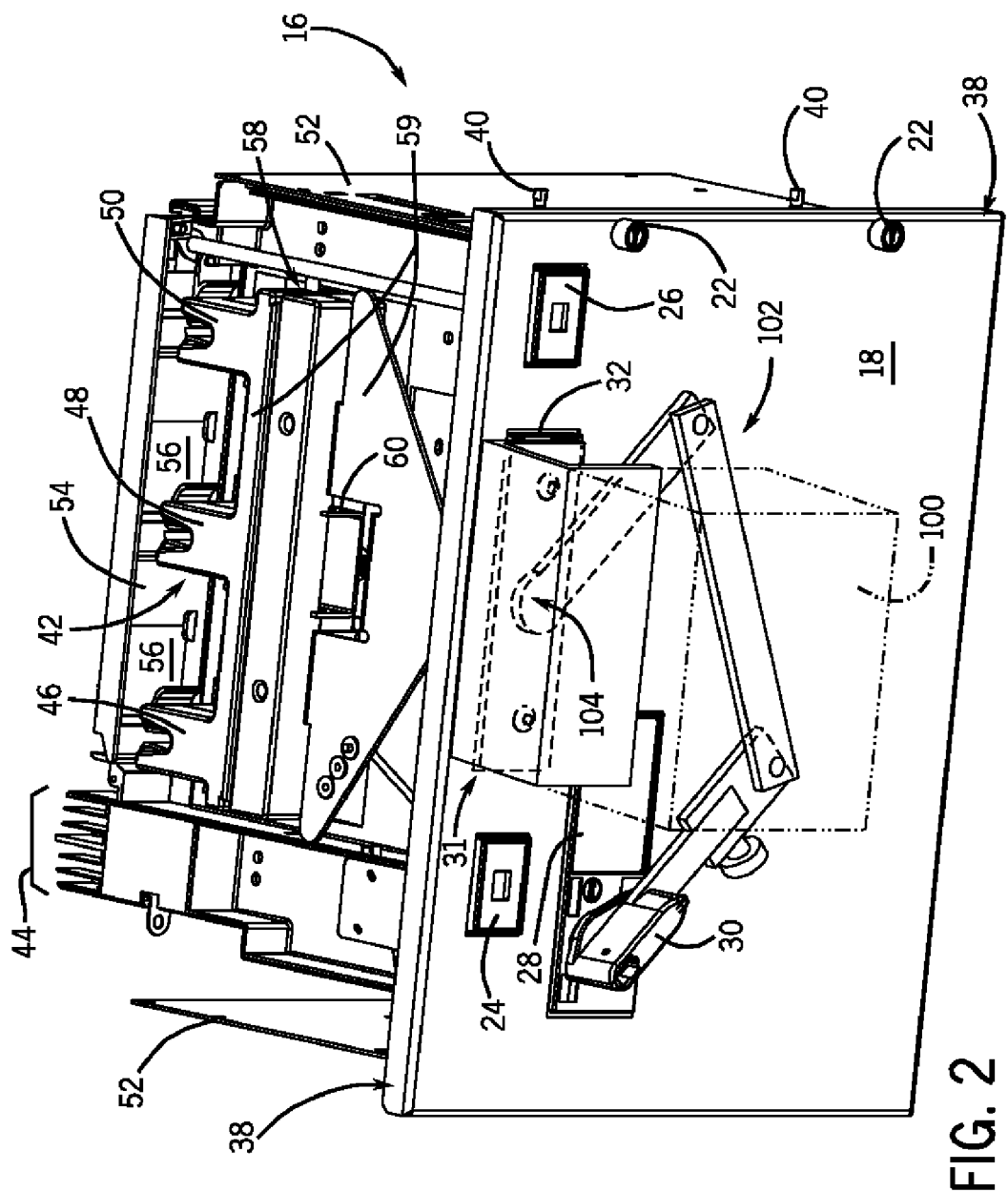
FIG. 2 is a perspective view of a motor control center subunit of FIG. 1, removed from the motor control center, according to an embodiment of the present invention.

Referring now to FIG. 2, a perspective view of a motor control center bucket 16 is shown. It is noted that bucket 16 may have a housing that includes a number of panels surrounding bucket 16 to fully or partially enclose the components thereof. As shown, bucket 16 includes a pair of side panels 52 and a front panel 18, which support motor control devices and internal bucket components. An upper panel and a rear panel have been removed to show the internal components of bucket 16. Front panel 18 is configured to fit snugly and securely within a motor control center such that a rim 38 of the front panel 18 seats against the inner periphery (not shown) of a motor control center enclosure. For purposes of dust protection, rim 38 may optionally include a compressible or flexible seal, such as a rubber seal, or other gasket-type component. Once bucket 16 is inserted into a motor control center enclosure, latch mechanisms 22 may be turned with a key, a screwdriver, or by hand so that latch arms 40 abut an inner surface of the outer periphery (not shown) of an enclosure to hold bucket 16 in place and/or prevent bucket 16 from being removed. Similarly, an automatic retention latch 60 is shown in an engaged position. Upon advancement of line contacts or stabs 46, 48, 50 automatic retention latch 60 is triggered to engage a frame or divider pan (FIG. 7) that segregates upper and lower compartments of the motor control center unit in which bucket 16 is installed.

When slide 32 of line contact actuator 31 is moved aside, an opening 36 is exposed. Opening 36 preferably has a unique configuration to accept a specialized crank 34 (as shown in FIG. 1). Additionally, when slide 32 is moved aside as shown, slide 32 extends over a portion of front panel 18. Thus, in embodiments in which front panel 18 is a hinged door, moving slide 32 to expose opening 36 will inhibit a user from opening front panel 18. Accordingly, so long as an operator has a crank inserted into opening 36 of actuator 31, the operator cannot open the door of the bucket 16.

Bucket 16 also includes a number of conductive line contacts or stabs 44, 46, 48, 50. Control power contact 44 is preferably fixedly attached to the rear of bucket 16, whereas supply power stabs 46, 48, 50 are moveable with respect to bucket 16. However, it is appreciated that control power contact 44 may also be moveable in a similar manner to line power stabs 46, 48, 50. Control power contact 44 is of a suitable construction to conduct a control power (typically a few volts) to motor control components (not shown) disposed within bucket 16. In embodiments where control power contact 44 is permanently positioned at the rear of bucket 16, control power contact 44 will engage a control power supply line or bus upon installation of bucket 16 into a motor control center.

Supply power stabs 46, 48, 50, on the other hand, do not initially engage supply power lines or buses when bucket 16 is installed into a motor control center. Rather, stabs 46, 48, 50 are initially in retracted position 42, disposed inside bucket 16. One skilled in the art will appreciate that a number of configurations of supply power stabs 46, 48, 50 may be utilized. In the embodiment shown, stabs 46, 48, 50 are shaped to grasp about a supply line, bus, or riser of the motor control center 10 of FIG. 1.

The stab assembly 58, in addition to stabs 46, 48, 50, also includes a stab bracket 59 to which the stabs 46, 48, 50 are attached. Stab bracket 59 holds stabs 46, 48, 50 in an orientation for subsequent engagement with the supply power lines or buses of motor control center 10 of FIG. 1. It is recognized, however, that stab assembly 58 of FIG. 2 may include any number of configurations, such as for independently moveable stabs, for other than three stabs, or for actuation by other than a shaft, as will be described below. A shutter or isolator assembly 54 is disposed in the rear of bucket 16, between stab assembly 58 and the exterior of bucket 16. Isolator assembly 54 includes a number of moveable shutters 56 which operate to either expose or isolate the stabs 46, 48, 50 from the power lines or buses of the motor control center 10 of FIG. 1.

Figure 3:
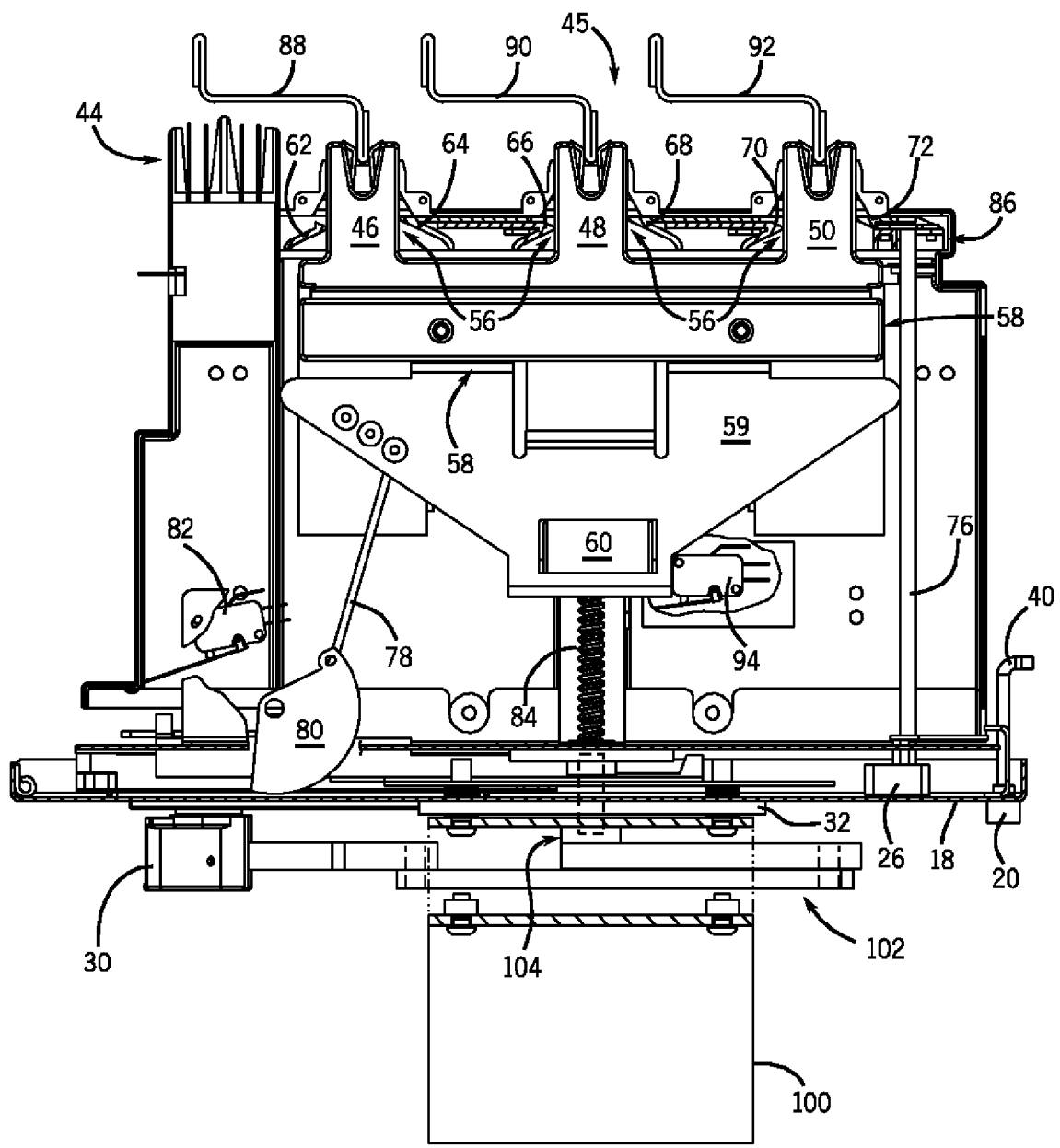
FIG. 3 is a top view of the motor control center subunit of FIG. 2 showing a number of stabs in an extended position.

Referring now to FIG. 3, stab assembly 58 is shown having stabs 46, 48, 50 positioned in an extended/engaged position 45. In operation, stabs 46, 48, 50 are advanced or extended towards shutters 56 and impinge upon angled portions 62-72 of the shutters 56. As the stabs 46, 48, 50 are forced forward into and against the surfaces of shutters 56, the stabs 46, 48, 50 separate the left angled portions 62, 66, 70 and right angled portions 64, 68, 72 of the shutters 56 to expose the stabs 46, 48, 50 to supply power buses 88, 90, 92, respectively. Preferably, a biasing or closure force is provided to bias the right angled portions 64, 68 72 and the left angled portions 62, 66, 70 towards one another, so that the shutters 56 automatically close upon retraction of stabs 46, 48, 50. It is recognized that numerous other ways of opening and closing shutters 56 are possible and contemplated. For example, rather than employing two shutter portions for each shutter, one shutter portion having one beveled surface could be slid aside by the advancement of the stabs. Or, the shutters could be connected for manipulation by the turning of rotary shaft 84. Thus, the shutters 56 could comprise one or several sliding panels with or without beveled surfaces. In other words, shutters 56 may be operated to open and close by the movement of the stabs, by the movement of the stab assembly, by the turning of the actuating shaft, by other actuating components, or by a manual control. Regardless, once the stabs 46, 48, 50 have penetrated through shutters 56, the stabs 46, 48, 50 may be advanced or extended to engage power supply bus bars 88, 90, 92. The shutter 56 for stab 50 includes an additional mechanical connection 74. That is, a shutter arm 74 is provided to control a shutter indicating mechanism 76 which displays to an operator via front panel indicator 26 whether the shutters 56 are open or closed. Similarly, a cam or bell crank 80 is attached via rod 78 to stab assembly 58 to translate movement of the stab to a microswitch 82. Microswitch 82 operates to turn on and off the supply of control power from control power contact 44 to motor control components, such as contactors or overload relays (not shown), of bucket 16.

Also shown in FIG. 3 is a second microswitch 94 connected to activate and deactivate circuit breaker 28. When stabs 46, 48, 50 reach the fully engaged position 45 with bus bars 88, 90, 92, stab bracket 59 of stab assembly 58 actuates microswitch 94. When actuated, microswitch 94 permits closure of circuit breaker 28 completing the circuit between bus bars 88, 90, 92 and the line side of motor control components (not shown) in bucket 16. Otherwise, microswitch 94 prevents closure of circuit breaker 28.

For removal of bucket 16, circuit breaker 28 is opened (by way of disconnect handle 30), disconnecting supply power to the motor control devices (not shown) of bucket 16. Stabs 46, 48, 50 may then be retracted from bus bars 88, 90, 92 by a reverse motion of rotary shaft 84. Once stabs 46, 48, 50 pass shutters 56, the right and left portions 62-72 thereof will automatically close together to isolate the stabs from bus bars 88, 90, 92. Preferably, the shutter portions 62-72 and all or some of the housing panels, including front panel 18 and a rear panel (not shown), of bucket 16 are formed of plastic or another insulating material. After stabs 46, 48, 50 have been fully retracted, automatic latch 60 will release from engagement with the motor control center, and an operator may then slide bucket 16 out of the motor control center.

As shown in each of FIGS. 1-3, a control mechanism 100 (i.e., disconnect actuating mechanism) is attached to front panel 18 of the subunit 16 to activate and deactivate the circuit breaker 28 in an electrical or electromechanical fashion. Control mechanism 100 allows for connecting/disconnecting (i.e., opening/closing) of the circuit breaker 28 from a remote location, by allowing for remote actuation of subunit disconnect handle 30. Control mechanism 100 is connected to disconnect handle 30 by way of an adapter, which in one embodiment comprises a linkage system 102, such that the disconnect handle 30 can be actuated between an "ON" and "OFF" position. Control mechanism 100 includes a motor drive 104, such as a geared electric motor or rotary actuator, to cause rotation and translation of the linkage system, thus also causing rotation of the subunit disconnect handle 30. It is also envisioned, however, that control mechanism 100 can include other mechanisms for driving rotation, such as a pneumatic cylinder actuator or spring charged actuation device.

Referring now to FIGS. 4A and 4B, one embodiment of control mechanism 100 is shown in greater detail. Control mechanism 100 includes thereon a pair of fastening knobs 106 for securing the control mechanism to front panel 18 of the subunit 16. Fastening knobs 106 are affixed to a screw (not shown) running through the length of control mechanism 100 and extending out a back side thereof such that the screws can be threadingly engaged with anchor points 35 formed on the line contact actuating assembly 31 located on the front panel 18 (see FIG. 1). The pair of fastening knobs 106, and engagement thereof with anchoring points 35, secures control mechanism 100 to the subunit 16 such that rotation of the control mechanism 100 unit is prevented when the geared electric motor 104 therein drives rotation of the disconnect handle 30.

Control mechanism 100 is connected to subunit disconnect handle 30 by way of linkage system 102. Linkage system 102 is connected to the motor 104 of control mechanism 100 such that rotation of the motor 104 effects rotation of the linkage system 102 in either a clockwise or counterclockwise direction. Linkage system 102 is secured at the other end to disconnect handle 30, such as by a sleeve-shaped link 108 positioned over at least a portion of disconnect handle 30 and secured thereto via a turn-knob 110 configured to threadingly engage disconnect handle 30. As shown in FIG. 4A, disconnect handle 30 is in a "CLOSED" position such that circuit breaker 28 allows for power to be supplied to the motor control center subunit 16. Upon activation of control mechanism 100, motor 104 functions to actuate linkage system 102 to drive rotation thereof, and correspondingly drive rotation of the disconnect handle 30 in a plane parallel to front panel 18. Thus, as shown in FIG. 4B, disconnect handle 30 is rotated in a counter-clockwise direction to the "OPEN" position, and the power supply to the motor control center subunit 16 is disconnected.

Control mechanism 100 also includes thereon a display 112 configured to indicate a connection status of the circuit breaker 28 and of a power state of the control mechanism 100, such as by way of illuminated light-emitting diodes (LEDs). At a minimum, display 112 includes a "power" LED 114 for indicating whether control mechanism 100 is in a powered state, an "ON" LED 116 indicating that circuit breaker 28 is closed, and an "OFF" LED 118 indicating that circuit breaker 28 is open, as is determined by the position of disconnect handle 30. For providing power to control mechanism 100, a power cord (not shown) can be connected thereto to provide AC power, it is also envisioned that control mechanism 100 could be battery operated as well.

As shown in FIGS. 4A and 4B, control mechanism 100 also includes a receiver 122 therein to allow for wireless control thereof. That is, receiver 122 is configured to be in wireless communication with a remote control/device 124 (e.g., pendant station) to allow for activation of motor 104 and remote connection/disconnection of the circuit breaker assembly 28 via actuation of the disconnect handle 30. Remote control 124 can communicate with receiver 122 via one of several well-known wireless protocols, such as radio frequency (RF) signals or infrared signals. The range from which remote control 124 can communicate with receiver 122 can vary, but at a minimum should allow for operation of control mechanism 100 from a distance of 10-50 ft (~3-15 meters), such that an operator is outside of an arc flash zone of the motor control center 10. While wireless control of control mechanism 100 is preferred, it is also envisioned that in another embodiment, remote control 124 can be connected to control mechanism 100 by a communications cable (not shown).

Referring still to FIGS. 4A and 4B, to control operation of control mechanism 100 and motor drive 104 therein, remote control 124 includes an activation button 126, such as the push-button control shown in FIGS. 4A and 4B. It is also envisioned, however, that a switch or other suitable control could also be used rather than the push-button control. Remote control 124 also includes thereon indicator lights 128 to display the current state of circuit breaker 28. That is, indicator lights 128 display whether disconnect handle 30 is in the OPEN position or CLOSED position.

In one embodiment, remote control 124 is further configured to operate line contact motor control 37 by way of transmitting wireless signals to receiver 39 (FIG. 1), so as to engage/disengage stabs 46, 48, 50 (FIG. 2). Remote control 124 includes an activation button 130 for activating the line contact motor control 37 and indicator lights 132 for displaying whether stabs 46, 48, 50 (FIG. 2) are in an engaged or disengaged position. A view of the stabs in an engaged position is shown in FIG. 3.

As further shown in FIGS. 4A and 4B, control mechanism 100 also includes therein a sensing device 133 that functions, in part, to control operation of remote control 124. In an exemplary embodiment, sensing device 133 comprises a proximity sensor 134 that is configured to detect the presence of an operator or other objects within a defined "non-activation zone" (not shown) or distance from motor control center structure 10 (FIG. 1). The non-activation zone can be set by an operator based on various factors, and ideally should include an area surrounding the motor control center out to an arc flash safety boundary. In one embodiment of the invention, sensing device 133 is configured to deactivate control mechanism 100 upon detection of an object being present within the non-activation zone. That is, upon detection of an object being present within the non-activation zone by proximity sensor 134, sensing device 133 generates a deactivation signal and transmits that signal to motor 104 to prevent the motor from driving rotation of linkage system 102 and correspondingly driving rotation of the disconnect handle 30. Thus, closing of circuit breaker 28 (FIG. 1) is prevented, and the possibility of an arc flash is eliminated. It is also envisioned that sensing device 133 can include thereon an indicator mechanism 135. The indicator mechanism 135 can comprise an audible or visual indicator that generates an alert when an operator or other object is sensed by proximity sensor 134 as being within the non-activation zone. An operator can thus be made aware that control mechanism 100 has been deactivated and allow the operator to move outside of the non-activation zone, thus allowing for operation of the control mechanism by way of remote control 124 and for remote racking of the system 10 (FIG. 1) from a correct distance. While shown as being included on control mechanism 100, it is also envisioned that sensing device 133 could be designed as a separate, stand-alone mechanism mounted on bucket 16. Alternatively, it is also envisioned that sensing device 133 could be included in remote control 124 and that remote control 124 could be deactivated (for actuating control mechanism 100) when within a defined distance from control mechanism 100.

Figure 5:
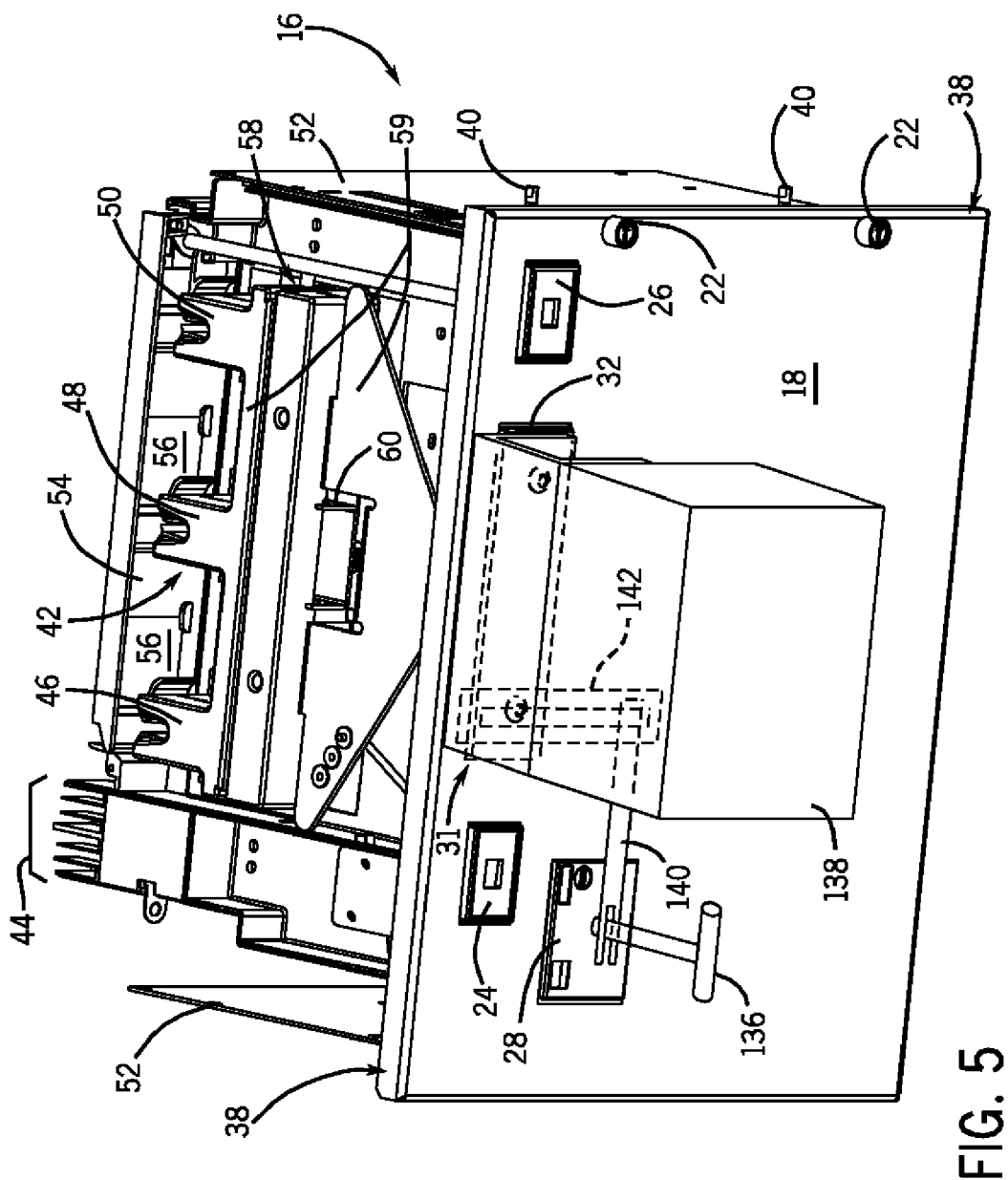
FIG. 5 is a perspective view of a motor control center subunit of FIG. 1, removed from the motor control center, according to another embodiment of the present invention.

Referring now to FIG. 5, in another embodiment of the present invention, disconnect handle 30 is in the form of a lever 136 that is rotatable in a plane perpendicular to front panel 18 (i.e., vertically up-down) to open and close the circuit breaker assembly 28. A control mechanism 138 is positioned to actuate the lever 136 and includes therein a forked connector 140 with arms positioned on opposing sides of lever 136 to cause translation thereof in an upward and downward direction. That is, control mechanism 138 includes a motor drive 142 therein that actuates a rotary drive 144 (FIG. 6) to cause translation of the forked connector 140 in either an up or down direction to actuate lever 136 into ON and OFF positions.

Figure 6:
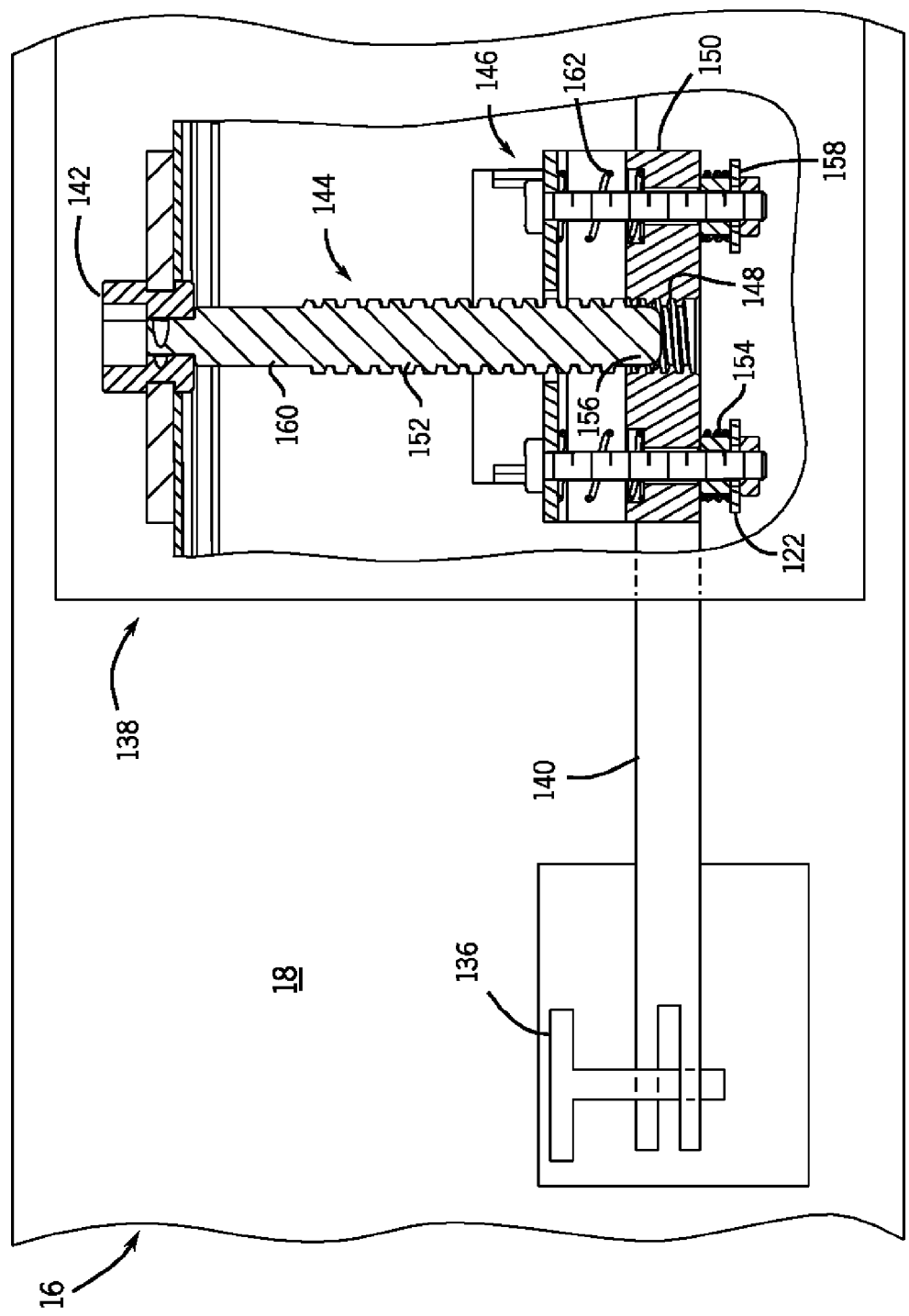
FIG. 6 is a front cross-sectional view of the control mechanism and the disconnect handle of FIG. 5.

A detailed view of control mechanism 138 is shown in FIG. 6. As shown therein, control mechanism 138 includes a clutch mechanism 146 engaged with rotary drive 144. Rotary drive 144 engages with threaded slot 148 of clutch plate 150. In operation, clutch or freewheeling mechanism 146 limits the translational movement of forked connector 140 such that the forked connector is able to translate between two limits: an ON position of lever 136 and an OFF position of lever 136. As rotary drive 144 is rotated and forked connector 140 advances to flip lever 136 between the ON and OFF positions, the threaded segment 152 of rotary drive 144 engages clutch plate 150 of clutch mechanism 146. As rotary drive 144 continues to rotate, clutch plate 150 also advances axially along rotary drive 144 and a second set of springs 154 begin to compress. When clutch plate 150 reaches the non-threaded end 156 of the drive 144, the second set of springs 154 are fully compressed between washer 158 and clutch plate 150, and lever 136 is in either the ON or OFF position. At this point, further rotation of drive 144 results in no further advancement of lever 136, as the non-threaded end 156 of drive 144 spins freely in clutch plate 150.

When a control signal is received by control mechanism 138 to switch the lever 136 between ON/OFF positions, drive 144 is rotated in the opposite direction. The second set of springs 154 impart a force between clutch plate 150 and the first thread of the threaded segment 152 of the drive 144, thus assisting with the engagement of threaded drive segment 152 and the threaded inner surface 148 of clutch plate 150. As drive 144 is rotated further, clutch plate 150 advances along the threaded drive segment 152 towards non-threaded segment 160 and the first set of springs 162 compress. When lever 136 is switched to the other of the ON/OFF positions, drive 144 freely rotates about non-threaded drive segment 160, the second set of springs 154 is compressed, and further rotation of drive 144 produces no additional translation.

Thus, a remotely controlled actuation mechanism has been disclosed, in a number of embodiments, for actuating a circuit breaker disconnect handle from a remote location outside of the arc flash zone of a motor control center. The actuation mechanism (i.e., control mechanism) is attached to the front panel of a motor control center subunit and includes therein a motor drive that generates a torque for actuating the subunit disconnect handle. One of several adapters is included in the actuation mechanism to connect the motor drive to the disconnect handle and allow for translation of the disconnect handle. A remote control is provided that sends control signals to a receiver in the actuation mechanism, to activate the motor drive, and correspondingly actuate the disconnect handle. The control signals can be transmitted wirelessly or via a control cable. It is appreciated that the remotely controlled actuation mechanism may find applicability in motor control centers or other high power electrical switchboard and panel board arrangements. Similarly, while the unit disconnects that control connection of the motor control center to the supply power is described herein as a circuit breaker assembly, it is understood that fused disconnect arrangements are also envisioned as being controlled by way of remote actuation of the disconnect handle.

Therefore, according to one embodiment of the present invention, a motor control center subunit includes a subunit housing configured to fit within a motor control center and a subunit disconnect configured to selectively control a supply power to motor control components of the subunit housing. The motor control center subunit also includes a control mechanism attached to the subunit housing to activate and deactivate the subunit disconnect and a remote control device configured to operate the control mechanism to activate and deactivate the subunit disconnect.

According to another embodiment of the present invention, a remotely controlled actuation mechanism for actuating a circuit breaker disconnect handle including a housing, an electric motor positioned within the housing and configured to generate an output torque, and an adapter coupled to the electric motor and to a disconnect handle of a circuit breaker assembly, the adapter configured to transfer the output torque to the disconnect handle so as to translate the disconnect handle between a first position and a second position. The remotely controlled actuation mechanism also includes a remote control configured to send control signals to the electric motor from a remote location so as to activate the electric motor to translate the disconnect handle.

According to yet another embodiment of the present invention, a motor control center includes a motor control center frame having at least one compartment, a motor control center subunit constructed to seat in the at least one compartment of the motor control center frame, and a circuit breaker assembly configured to selectively control a supply power to the motor control center subunit. The motor control center also includes a disconnect handle attached to the subunit housing and constructed to open and close the circuit breaker assembly to selectively control the supply power to the motor control center subunit and a remotely controlled actuating mechanism to actuate the disconnect handle and remotely control at least one of the opening and closing of the circuit breaker assembly.

The present invention has been described in terms of the preferred embodiment, and it is recognized that equivalents, alternatives, and modifications, aside from those expressly stated, are possible and within the scope of the appending claims.

What is claimed is:

1. A motor control center subunit comprising:
   a subunit housing configured to fit within a motor control center, the subunit housing including a dead front panel having a line contact actuator assembly thereon, with the line contact actuator assembly having anchor points formed therein;
   a subunit disconnect configured to selectively control a supply power to motor control components of the subunit housing;
   a control mechanism attached to the subunit housing to activate and deactivate the subunit disconnect, the control mechanism comprising a plurality of mounting knobs configured to threadingly engage the anchor points on the line contact actuator assembly to secure the control mechanism to the subunit housing; and
   a remote control device configured to operate the control mechanism to activate and deactivate the subunit disconnect.

2. The motor control center subunit of claim 1 further comprising a disconnect handle attached to the subunit housing and constructed to activate and deactivate the subunit disconnect.

3. The motor control center subunit of claim 2 wherein the control mechanism comprises an electronic motor drive configured to actuate the disconnect handle.

4. The motor control center subunit of claim 3 wherein the control mechanism further comprises a linkage system connected to an output of the motor drive at a first end thereof and secured to the disconnect handle at a second end thereof, the linkage system effecting rotation of the disconnect handle in both of a clockwise and counterclockwise direction.

5. The motor control center subunit of claim 3 wherein the control mechanism further comprises:
   a screw drive attached to the electronic motor drive;
   a forked connector linearly translated by the screw drive and configured to actuate the disconnect handle between an activation position and a deactivation position; and
   a freewheeling mechanism attached to the screw drive and configured to allow the screw drive to free-wheel therein when the disconnect handle is at the activation position and the deactivation position.

6. The motor control center subunit of claim 2 wherein the control mechanism comprises one of a pneumatic cylinder actuator and a spring-charged actuator to actuate the disconnect handle.

7. The motor control center subunit of claim 1 further comprising a line contact motor drive in operable association with a plurality of conductive contacts within the subunit housing to move the plurality of conductive contacts between a retracted position and an extended position; and
wherein the remote control device is configured to operate the line contact motor drive via wireless signals.

8. The motor control center subunit of claim 1 wherein the control mechanism further comprises a receiver configured to receive wireless signals from the remote control device.

9. The motor control center subunit of claim 1 wherein the control mechanism further comprises a sensing device configured to deactivate the control mechanism when an object is sensed within a pre-defined distance thereof.

10. The motor control center subunit of claim 1 wherein the remote control device comprises a pendant station connected to the control mechanism via a communication cable.

11. The motor control center subunit of claim 1 wherein the subunit disconnect comprises one of a circuit breaker assembly and a fused disconnect.

12. A remotely controlled actuation mechanism for actuating a circuit breaker disconnect handle comprising:
a housing;
an electric motor positioned within the housing and configured to generate an output torque;
an adapter coupled to the electric motor and to a disconnect handle of a circuit breaker assembly, the adapter configured to transfer the output torque to the disconnect handle so as to translate the disconnect handle between a first position and a second position;
a remote control configured to send control signals to the electric motor from a remote location so as to activate the electric motor to translate the disconnect handle;
a display comprising a plurality of indicators thereon, the plurality of indicators configured to indicate a status of the circuit breaker assembly; and
a plurality of fastening knobs attached to the housing and configured to threadingly fasten the actuation mechanism to a front panel of a motor control center subunit having a line contact actuator assembly thereon, wherein the plurality of fastening knobs threadingly engage anchor points on the line contact actuator assembly to secure the remotely controlled actuation mechanism to the front panel of the motor control center subunit.

13. The actuation mechanism of claim 12 further comprising a receiver electrically connected to the electric motor and configured to receive wireless control signals from the remote control so as to control activation of the electric motor.

14. The actuation mechanism of claim 12 wherein the disconnect handle comprises a handle rotatable in a plane parallel to the front panel.

15. The actuation mechanism of claim 14 wherein the adapter comprises a linkage system connected to an output of the electric motor at a first end thereof and secured to the disconnect handle at a second end thereof, the linkage system effecting rotation of the disconnect handle in both of a clockwise and counterclockwise direction.

16. The actuation mechanism of claim 12 wherein the disconnect handle comprises a lever vertically translatable in a plane perpendicular to the front panel.

17. The actuation mechanism of claim 16 wherein the adapter comprises a screw drive attached to the electric motor;
a forked connector linearly translated by the screw drive and configured to actuate the disconnect handle between an activation position and a deactivation position; and
a freewheeling mechanism attached to the screw drive and configured to allow the screw drive to free-wheel therein when the disconnect handle is at the activation position and the deactivation position.

18. A motor control center comprising:
a motor control center frame having at least one compartment;
a motor control center subunit constructed to seat in the at least one compartment of the motor control center frame;
a circuit breaker assembly configured to selectively control a supply power to the motor control center subunit;
a disconnect handle attached to a housing of the motor control center subunit and constructed to open and close the circuit breaker assembly to selectively control the supply power to the motor control center subunit; and
a remotely controlled actuating mechanism to actuate the disconnect handle and remotely control at least one of the opening and closing of the circuit breaker assembly, the remotely controlled actuating mechanism including a display having a plurality of indicators thereon, the plurality of indicators configured to indicate a status of the circuit breaker assembly, a power state of the remotely controlled actuating mechanism, and an engagement status of a plurality of supply power stabs in the motor control center subunit to a power supply;
wherein the housing of the motor control center subunit includes a dead front panel having a line contact actuator assembly thereon, the line contact actuator assembly having anchor points formed therein; and
wherein the actuating mechanism further comprises a plurality of mounting knobs configured to threadingly engage the anchor points on the line contact actuator assembly to secure the actuating mechanism to the housing of the motor control center subunit.

19. The motor control center of claim 18 further comprising a remote control device configured to operate the actuating mechanism from a remote location outside an arc flash zone of the motor control center.

20. The motor control center of claim 19 wherein the remote control device communicates with the actuating mechanism via a wireless communication protocol.

21. The motor control center of claim 18 wherein the actuating mechanism comprises:
an outer housing;
an electric motor positioned within the outer housing and configured to generate a torque sufficient to rotate the disconnect handle; and
a mechanized actuator arm connected to the electric motor and to the disconnect handle and configured to transmit the torque from the electric motor to the disconnect handle.

22. The motor control center of claim 18 wherein the actuating mechanism comprises:
a screw drive attached to the motor drive and configured to linearly translate the disconnect handle between an activation position and a deactivation position;
a freewheeling mechanism attached to the screw drive and configured to allow the screw drive to free-wheel therein when the disconnect handle is at the activation position and the deactivation position.

* * * * *